United States Patent Office 3,057,946
Patented Oct. 9, 1962

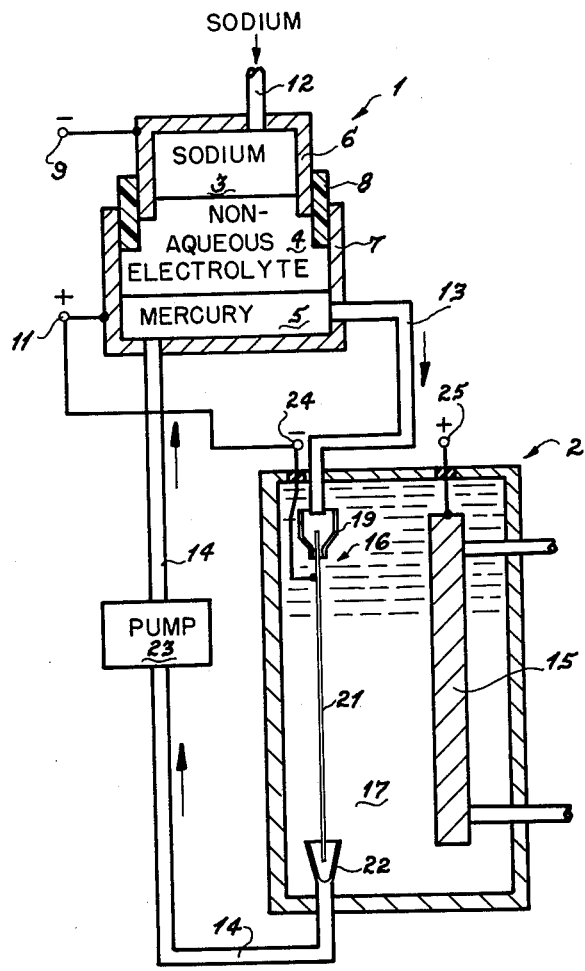

3,057,946
FUEL CELL SYSTEM
Samuel Eidensohn, Riverton, N.J., assignor to The Electric Storage Battery Company, a corporation of New Jersey
Filed Dec. 31, 1959, Ser. No. 863,144
2 Claims. (Cl. 136—86)

This invention relates to improvements in fuel cells for the direct conversion of the chemical energy into electrical energy. More particularly, the present invention relates to a fuel cell system in which the anodic fuel is produced by means which provide additional electrical energy.

A fuel cell may be considered a primary battery having means for replenishing the electro-chemically active materials of the couple. Like a battery, a fuel cell consists of an anode at which oxidation takes place, an electrolyte, and a cathode at which an oxidizing agent is consumed. The most commonly used oxidizing agent for fuel cells is molecular oxygen either in the pure form or in the form of air. The commonly used anodic material is hydrogen, however, other gases, such as carbon monoxide, have been used as an anodic material, but many of these require high temperatures and fused salt electrolytes. A serious limitation of both the hydrogen-oxygen fuel cell and the carbon monoxide-oxygen fuel cell is their relatively low output voltage which is generally less than one volt.

It has long been recognized that a higher cell potential may be achieved by utilizing a more active anodic material. For this purpose, sodium and other highly reactive alkaline metals have been suggested. For example, the theoretical output voltage of the sodium-oxygen couple should provide a cell potential of about 2.8 volts with an aqueous solution of sodium-hydroxide as the electrolyte. Such a fuel cell, however, is not practical because the sodium reacts rapidly with the water in the electrolyte to liberate hydrogen.

A stable fuel cell using sodium as the anodic material can be obtained if the sodium is used in an amalgam. For this purpose, an amalgam having a sodium concentration of about 0.2% by weight has been found satisfactory in a cell having a 40% solution of sodium hydroxide as the electroylte. Such a cell, however, has a potential of only 1.95 volts since 0.845 volt is lost in the amalgamation of the sodium. In such a fuel cell the amalgam is a liquid and is fed into the cell and bubbled over an inert conductor. For moderate temperatures the amalgam should not exceed 0.5% sodium. Thus, a higher voltage oxygen fuel cell can be obtained by utilizing a highly reactive alkaline metal such as sodium as the anodic material. However, even in the type of cell described it is impossible to obtain the theoretical voltage of the sodium-oxygen couple because of the energy lost as heat in the amalgamation of the sodium. In addition, efficiency per unit weight of such a system is low because of the equipment required to produce the amalgam.

It is, therefore, an object of the present invention to provide a system in which the full voltage of the sodium-hydrogen couple is obtained.

Another object of the present invention is to provide a fuel cell system in which the amalgam needed for the operation of an oxygen-sodium amalgam fuel cell utilizing an aqueous electrolyte is automatically provided at the rate demanded.

A further object of the present invention is to provide a fuel cell system characterized by a high output voltage and a high efficiency in terms of energy available per unit weight.

In accordance with the present invention, there is provided a two stage system which comprises a sodium-sodium amalgam cell and a sodium amalgam-oxygen fuel cell. The electrical output of the two cells is connected in series to provide a unit output voltage of 2.8 volts and the system is so designed that the first stage produces sodium-amalgam at the rate at which it is consumed in the second stage.

A better understanding of the present invention may be had from the following description when read with reference to the accompanying drawing which is a schematic representation of the fuel cell system of the present invention.

Referring now to the drawing, the numeral 1 designates a sodium-sodium amalgam cell and the numeral 2 designates a sodium amalgam-oxygen fuel cell. The cells 1 and 2 constitute the two stage system of the present invention. The cell 1 comprises a sodium anode 3, non-aqueous electroylte 4 and a mercury cathode 5. As shown, these elements may be housed in a suitable container comprising a top portion or anode compartment 6 in contact with the sodium anode 3 and the electrolyte 4 and a bottom portion or cathode compartment 7 in contact with the mercury cathode 5 and the electrolyte 4. The top portion 6 and the bottom portion 7 may be insulated from each other by an insulating spacer 8. A pair of output terminals 9 and 11 connected to the anode compartment 6 and the cathode compartment 7 respectively, are provided for contact with external circuits. Metallic sodium may be introduced into the anode compartment 6 in bulk form but preferably is fed into the compartment 6 continuously as by means of an extruder. A conduit 12 connecting with the anode compartment 6 is provided for this purpose.

As described hereinbefore, the sodium-sodium amalgam cell which is in the first stage of the present invention in addition to being adapted to provide an electrical output is adapted to produce the sodium amalgam to be utilized in the sodium amalgam-oxygen fuel cell 2 which constitutes the second stage of the system of the present invention. To this end, an amalgam discharge conduit 13 and a depleted amalgam recycling conduit 14 are provided which connect the cathode compartment 7 of the cell with the fuel cell 2. The sodium-sodium amalgam cell 1 is adapted for operation at either moderate or high temperatures. For high temperature operation the non-aqueous electrolyte 4 may comprise a molten mixture of 76% sodium-hydroxide, 10% sodium-bromide and 14% sodium-iodide which is an excellent conductor at a temperature of 230° C. For operation at moderate temperatures, that is at temperatures less than 100° C., a solution of sodium-iodide in ethylamine has been found to provide a suitable electrolyte.

In operation, the non-aqueous electrolyte acts as an ionic conductor and does not enter into the electrode reactions which are as follows:

Anode: $Na \rightarrow Na^+ + e^-$
Cathode: $e^- + Na^+ \rightarrow Na(Hg)_x$

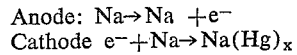

These reactions produce a cell potential of 0.845 volt. As a result of these reactions sodium going into the solution in the electrolyte deposits in the mercury and forms an amalgam which may be utilized as the anodic material for the fuel cell 2 in the manner to be described hereinafter. It should be understood that while the amalgam produced in the sodium-sodium amalgam cell 1 may be accumulated in a suitable reservoir it is preferably fed directly into the fuel cell 2 with the two cells connected electrically in a series.

The sodium amalgam-oxygen fuel cell 2 comprises an oxygen electrode 15, a cathode 16 and an aqueous electrolyte 17. As shown, these components may be housed in a suitable container 18. The anode or oxygen electrode 15 may be tubular in form and made of water-proofed porous graphite or may comprise a sintered body of suitable metal, such as silver. The electrolyte 17 is preferably a 40% solution of sodium-hydroxide and water. Since the sodium-amalgam or the anodic fuel is a liquid, suitable structure is provided wherein the sodium amalgam is bubbled over an inert conductor. To this end, the amalgam enters the fuel cell 2 by means of the conduit 13 into a suitable discharge funnel 19 which is adapted to permit small globules of the amalgam to flow down over the face of a metallic plate 21 which may comprise a sheet of steel or other metal inert to the reaction of the cell. The amalgam globules flowing over the face of the plate 21 are recovered by means of a recovery funnel 22 at the bottom edge of the plate 21 which is connected with the amalgam recycling conduit 14. Suitable pumping means 23 in the conduit 14 are provided to return the amalgam to the cell. A pair of output terminals 24 and 25, connected with this steel plate 21 and oxygen electrode 11 respectively, are provided for connection with external circuits.

In the operation of the fuel cell 2, the mercury takes no place in the reaction and simply functions as a carrier and moderator for the sodium. The electrode reactions of the fuel cell 2 are as follows:

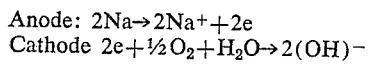

Anode: $2Na \rightarrow 2Na^+ + 2e$
Cathode $2e + \frac{1}{2}O_2 + H_2O \rightarrow 2(OH)^-$ The cell has an output voltage of 1.96 volts and is adapted to be operated at within a temperature range of from 50 to 60° C.

In accordance with the present invention, the negative output terminal 24 of the fuel cell 2 is connected to the output terminal 11 of the sodium-sodium amalgam cell 1 by means of a conductor 26. Since both stages are connected in series, the rate of solution of sodium and the formation of amalgam in cell 1 is equal to the rate of of the consummation of amalgam in the fuel cell 2. Accordingly, the systems are balanced and the cell produces the exact amount of amalgam required by the fuel cell 2. In addition, the two series connected stages provide the full output voltage available from the sodium-oxygen couple, 2.8 volts.

From the foregoing, it can be seen that the two stage system of the present invention not only provides a means for obtaining the full output voltage available from the sodium-oxygen couple but also provides a system which is inherently efficient. The mercury utilized as the inert carrier for the sodium is not consumed but is recirculated within the system. Accordingly, the system requires only two fuels, sodium and oxygen. It will be apparent to those skilled in the art that changes may be made from the form of apparatus disclosed without departing from the spirit of the invention as set forth in the appended claims.

Having described the present invention, that which is claimed as new is:

1. In combination, a fuel cell utilizing oxygen as the cathodic material, sodium-amalgam as the anodic material and sodium-hydroxide as the electrolyte, a sodium-sodium amalgam cell having a sodium anode, a mercury cathode and a non-aqueous electrolyte selected from the group consisting of a molten mixture of 76% sodium hydroxide, 10% sodium bromide, and 14% sodium iodide and a solution of sodium iodide in ethyl amine, means for feeding the amalgam produced in said sodium-mercury cell to the sodium amalgam-oxygen fuel cell for use as the anodic fuel, means for feeding depleted amalgam from said fuel cell to the cathode of said sodium-sodium amalgam cell, and means electrically connecting the mercury cathode of said sodium-sodium amalgam cell to the anode of said fuel cell.

2. An electrical energy generating system utilizing sodium and oxygen as fuels comprising, in combination a sodium-sodium amalgam cell having a sodium anode, a mercury cathode and a non-aqueous electrolyte selected from the group consisting of a molten mixture of 76% sodium-hydroxide, 10% sodium-bromide and 14% sodium-iodide and a solution of sodium-iodide in ethylamine, said sodium-sodium amalgam cell being operative to produce a sodium amalgam, a sodium amalgam-oxygen fuel cell utilizing sodium amalgam as the anodic fuel, oxygen as the cathodic fuel and an alkaline electrolyte, means for feeding the amalgam produced in the sodium-sodium amalgam cell to the anode of the sodium amalgam-oxygen fuel cell for use as the anodic fuel, means for feeding depleted amalgam from the anode of said fuel cell to the cathode of said sodium-sodium amalgam cell, and means electrically connecting the cathode of said sodium-sodium amalgam cell to the anode of said fuel cell, said series connected system having substantially the full output voltage of the sodium-oxygen couple.

References Cited in the file of this patent
UNITED STATES PATENTS

| 307,461 | Hickley | Nov. 4, 1884 |
| 588,276 | Kellner | Aug. 17, 1897 |
| 1,015,734 | Heuser | Jan. 23, 1912 |
| 2,390,591 | Janes | Dec. 11, 1945 |
| 2,863,933 | Minnick | Dec. 9, 1958 |